3,029,121
PROCESS OF COLORING BY OXIDIZING SOLID POLYESTERS OF TEREPHTHALIC ACID AND GLYCOLS AND REACTING WITH HYDRAZINE COMPOUNDS AND PRODUCTS PRODUCED THEREBY

Robert J. Collins, Kinston, N.C., assignor to E. I. du Pont de Nemours and Company, Wilmington, Del., a corporation of Delaware
No Drawing. Filed Apr. 8, 1959, Ser. No. 804,889
19 Claims. (Cl. 8—4)

This invention relates to modified polyesters and to methods for their preparation. More particularly, it relates to the attachment of useful compounds to the surface of polyesters of terephthalic acid.

Polyesters prepared from terephthalic acid and glycols having from 2 to 10 carbon atoms, as disclosed in U.S. 2,465,319, possess many properties which make them useful as articles of commerce, especially in the forms of fibers and films. However, due to the chemical inertness of the polymer, articles manufactured from polyesters have suffered from the disadvantages of poor dyeability and high resistance to change in surface characteristics by the attachment of other compounds. Effective dyeing procedures, for example, have hitherto required the use of high temperatures and swelling agents. A considerable amount of effort has been spent in developing ways of attaching useful compounds to the surface of polyester articles, but so far few methods have been found which are capable of giving a satisfactory permanent combination.

This invention has as its object the attachment of useful compounds to the surface of polyester structures. Another object is the provision of a method for attaching washfast coloring material to the surface of polyester structures. A further object is the provision of a low temperature coloration procedure for polyester structures. Other objects will appear as the description of the invention proceeds.

These and other objects are realized by first subjecting a polyester structure to a surface activating treatment such as treatment with a chemical oxidizing reagent including exposure to high energy irradiation, and thereafter treating the polyester structure with a dilute solution of a hydrazine compound of the formula $R_1R_2NNH_2$ in which $R_1$ and $R_2$ stand for hydrogen or a monovalent hydrocarbon or heterohydrocarbon radical. $R_1$ may be the same as $R_2$, or different from $R_2$, and each radical may carry substituent groups, if desired. The term heterohydrocarbon is intended to cover compounds in which a hydrocarbon chain or ring contains one or more divalent heteroatoms or radicals attached to the carbon atoms in the chain or ring. Examples of such heteroatoms or radicals are oxygen, nitrogen, sulfur, silicon, phosphorus and similar elements.

Illustrative of the hydrazine compounds which may be used in this invention are: ethylhydrazine, butylhydrazine, dodecylhydrazine, cetylhydrazine, phenylhydrazine, methoxyphenylhydrazine, p - nitrophenylhydrazine, 6 - aminohexylhydrazine, 2 - hydroxyethylhydrazine, 2,4 - dibromophenylhydrazine, hydrazinobenzoic acid, hydrazinosalicyclic acid, α-hydrazinophenylacetic acid, o-hydrazinocynammic acid, hydrazinopyridine, hydrazinoquinoline, 1,1-dimethylhydrazine, 1,1-diethylhydrazine, 1-butyl-1-ethylhydrazine, 1-benzyl-1-phenylhydrazine, 1,1-bis(2,4-dibromo - 6 - nitrophenyl)hydrazine, 1-(4-bromo-2-nitrophenyl)-1-methylhydrazine, 1 - methyl-1-(o-methylaminophenyl)hydrazine, and 1-(2,4-dinitro-1-napthyl)-1-methylhydrazine.

Surprisingly, the process of this invention results in the permanent attachment of the hydrazine compound to the polyester structure, thereby creating a new composition of matter with useful properties. In a particularly useful embodiment of the invention a washfast and sublimation-fast coloration is imparted to polyester structures which may be in the form of fibers, films and the like.

The surface activating treatment is essential if useful amounts of the hydrazine compound are to be attached to the polyester. An important class of activating treatments includes exposure to chemical oxidizing systems, e.g., mixtures of ozone and air, solutions of peractetic acid, solutions of sodium chlorite, solutions of hydrogen peroxide, solutions of chromic acid, and solutions of potassium permanganate. A second important class of activating treatments includes exposure of the polyester structure to high energy irradiation, as described in Belgian Patent 546,815.

The conditions of treatment may be varied to yield products exhibiting the desired degree of modification, as measured by the amount of hydrazine compound attached or the degree of coloration achieved. For example, in the generation of reactive groups by treatment with ozone, although elevated temperatures permit reduced treating time for comparable results, room temperature ordinarily is satisfactory, and lower temperatures may be employed to restrict depth or extent of surface modification in structures so treated. Use of commercial ozone generators delivering from 0.5 to 3% of ozone in oxygen is most practicable, although higher concentrations of ozone may be used if available. Less than 0.5% of ozone is not considered an active concentration for the present purpose. The rate of modification often is greater in the presence of water vapor, and ultra-violet light may be used to catalyze the reaction if desired. Nitrogen and other inert gases may be present in the gaseous mixture without deleterious effect.

Likewise, where treatment with peracetic acid is used as a means of generating reactive groups on the polyester surface, the conditions of treatment may be varied to yield the desired degree of modification. Where a greater degree of surface modification is desired the peracetic acid solution will be applied at or near the boil. A lesser degree of modification will be obtained at lower temperatures and will be more restricted to the fiber surface. The concentration of the peracetic acid solution may fall in the range 0.5% to 43% with the higher concentration giving the greater degree of modification of polyester surface. Concentrations above 43% do not give a worthwhile increase in activity. The pH of the solution will generally fall below 6.0.

The concentration of peracetic acid can be varied by adjusting the proportions of glacial acetic acid and hydrogen peroxide in a mixture. The amount of available peracetic acid is found by:

$$\text{Keq.} = \frac{[\text{Per}][H_2O]}{[HOA_c][H_2O_2]}$$

where Keq.=2.5.

The conditions which may be employed with other chemical oxidizing reagents, e.g. sodium chlorite and potassium permanganate, will be apparent to those skilled in the art, the severity of treating conditions being dependent upon the degree of surface activation desired.

Following the pretreatment for generating reactive groups the polyester structure is brought in contact with a solution of the hydrazine reagent. This treatment takes place at elevated temperatures but will in general be satisfactory if carried out at room temperature. The solvent is not critical, but should not interfere with the reaction. A mixture of an organic solvent and water as, for example, a mixture of equal parts of methanol and water has been found satisfactory. The concentration of the substituted hydrazine compound in the solution can be as low as 0.05%. Concentrations much below this amount do not give an appreciable degree of modification. The upper limit of concentration is governed by the time and temperature of treatment. In any case it should not be sufficiently high to dissolve the polymer significantly.

The treatment is carried out for a period of time necessary to give the desired degree of modification which normally ranges from several minutes to several hours. Following the treatment with the hydrazine reagent, excess reagent may be removed if desired, by the use of solvents such as that used in applying the reagent. If more severe conditions are desired in order to remove all traces of excess hydrazine reagent, solvents such as boiling glacial acetic acid may be used.

Since the attached hydrazine compounds are generally localized in the surface zone of the polyester structure, the effective concentration is best expressed in relation to surface area rather than to total weight of polyester or to volume of the treated article. In general best results will be obtained when the amount of hydrazine compound attached falls in the range 0.05 to 0.45 millimole per square meter of polyester surface, and preferably in the range 0.20 to 0.40 millimole per square meter. Concentrations below 0.05 millimole per square meter are too low to serve a useful purpose, while concentrations above 0.45 millimole per square meter do not improve upon the results obtained in the preferred range.

Although the exact nature of the mechanism of attachment of the hydrazine reagent to the polyester molecular chain is not fully understood, the fact of the attachment is readily ascertained. Added to the evidence of the tenaciously adhering coloration imparted to the polyester structure is the positive identification of nitrogen in the structure by well-known chemical analytical procedures such as the Kjehldahl nitrogen determination, and identification by absorption spectra of hydrazones in solutions obtained by stripping the outer layer of polymer from the polyester article with dilute aqueous sodium hydroxide.

The sites of attachment for the hydrazine reagent do not appear to be the carboxyl groups known to be generated in polyester structures by oxidizing agents such as ozone and peracetic acid since exposure to hydrazine does not reduce the absorption of basic dyes by such treated structures. If hydrazine reacted with carboxyl groups, the reduction in number of free carboxyl groups upon treatment with hydrazine would be expected to show up as decreased dyeability with basic dyes. Because of this, and since hydrazine compounds are known to react readily with carbonyl groups, it is postulated that in the process of this invention the hydrazine reagents are attached by reaction with carbonyl groups generated in the polyester structure by the activating pretreatment. Since the presence of carbonyl groups in such polyester structures was hitherto unsuspected, the results achieved by this invention are both novel and surprising.

The following examples more clearly illustrate the invention.

EXAMPLE I

A sample of worsted fabric woven from 2 denier per filament polyethylene terephthalate staple yarn is suspended on a rack in the center of an oven of 3.0 cubic feet capacity maintained at a temperature of 190° C. while delivering into the oven from a commercial ozone generator 0.1 cubic feet per minute of 2% ozone in oxygen. The treatment is continued for 30 minutes. The pretreated fabric sample is then immersed in a 0.1% solution of 2,4-dinitrophenylhydrazine in 50% aqueous methanol for a period of two hours at room temperature. The fabric sample is removed, rinsed in fresh aqueous methanol in order to remove excess hydrazine reagent, and dried. The sample is found to have a vivid yellow color which is not removed or affected by a series of 10 simulated home launderings or by treatment with boiling glacial acetic acid. The color is also found to be sublimation-fast when the sample is subjected to exaggerated ironing conditions (300° F. for 2 min.). A similar fabric sample which did not receive the ozone pretreatment acquires a faint yellow color when treated with the 2,4-dinitrophenylhydrazine reagent.

A substantially equivalent result is obtained when phenylhydrazine is used in place of the 2,4-dinitrophenylhydrazine. Analysis of a sample of the phenylhydrazine-treated fabric for nitrogen by the Kjehldahl procedure indicates the presence of 0.12% nitrogen which corresponds to 0.21 millimole of phenylhydrazine per square meter of fiber surface.

EXAMPLE II

A skein of polyethylene terephthalate textile yarn is immersed for 1 hour in a 0.5% solution of peracetic acid adjusted to a pH of 6.0 with NaOH and maintained at a temperature of 60° C. The skein is rinsed thoroughly in water and then immersed for a period of 3 hours at room temperature in a solution of 0.2% phenylhydrazine in a 50–50 mixture of methanol and water. Excess hydrazine reagent is removed by immersing the skein in hot glacial acetic acid for 15 minutes. The skein now exhibits a vivid yellow color which is both washfast and sublimation-fast. Tenacity and elongation properties of the treated yarn are found to be substantially equivalent to those of the original yarn.

The stability of the bond formed between coloring agent and fiber is demonstrated by the fact that no change in color is noted when the yellow fiber is boiled for several hours in 5% sulfuric acid, or when stored for several months in cold 5% sulfuric acid.

Substantially equivalent results are obtained when the polyethylene terephthalate is in the form of a film having a thickness of 2 mils.

Samples which did not receive the peracetic acid pretreatment but which are treated similarly otherwise are found to exhibit only a faint yellow color.

EXAMPLE III

A series of seven samples of fabric woven from polyethylene terephthalate staple yarn are treated according to the general procedure of Example I with the exception that each sample is treated with a different hydrazine compound. The hydrazine compounds used and the colors achieved by the treatments are listed in the following table. The colors are found to be washfast and sublimation fast.

Table I

| Hydrazine reagent: | Fabric color |
|---|---|
| 2-hydrazinoquinoline | Medium brown. |
| 2-hydrazinobenzothiazol | Dark brown. |
| p-Hydrazinobenzoic acid | Deep yellow. |
| p-Hydrazinobenzenesulfonic acid | Medium yellow. |
| Semicarbazide hydrochloride | Light yellow. |
| Hydrazine hydrate | Light yellow. |
| 1,1-diphenylhydrazine | Deep yellow. |

The process of this invention obviously produces a useful result in providing a novel method of imparting color to textile fabrics woven from difficultly dyeable polyester yarns.

EXAMPLE IV

A sample of fabric woven from polyethylene terephthalate staple yarn is wrapped in aluminum foil and irradiated, using a Van de Graff generator under the conditions listed below:

| | |
|---|---|
| Voltage, mev. | 2 |
| Tube current, microamps | 290 |
| Conveyor speed, in./min. | 40 |
| Dose per pass, Mrep | 1 |
| Number of passes | 5 |
| Total dose, Mrep | 5 |

The irradiated sample is rinsed in distilled water and then immersed in a 0.05% solution of 2,4-dinitrophenyl-hydrazine in 50% aqueous methanol for four hours at room temperature. After rinsing thoroughly in fresh aqueous methanol the sample is found to have a bright yellow color which is not removed by soaking in glacial acetic acid. A non-irradiated control sample acquired only a faint yellow color.

EXAMPLE V

A sample of plain weave taffeta fabric woven from 70 denier polyethylene terephthalate filament yarn is treated for 30 minutes at the boil with a solution of the following composition:

| | |
|---|---|
| Water _____kg__ | 3 |
| Sodium chlorite _____gm__ | 6 |
| Oxalic acid _____gm__ | 6 |
| Sodium nitrate _____gm__ | 15 |
| Anionic wetting agent _____gm__ | 0.6 |

The sample is then rinsed and traces of chlorine removed by treating with a 0.1% solution of $NaHSO_3$ for 20 minutes at 60° C., followed by an additional rinse. The treated sample is then immersed in a 0.1% solution of 2,4-dinitrophenylhydrazine in 50% aqueous methanol as in Example I. The sample acquired a vivid yellow color which is wash fast and sublimation-fast.

For convenience, the preceding discussion has illustrated the benefits of this invention in terms of the application of color to polyester structures; however, the modification of polyester surfaces for other purposes will come readily to mind. For example, by choice of the proper hydrazine compound surface characteristics may be altered to improve such properties as static behavior and soil resistance. An outstanding advantage of the process of this invention is that in certain embodiments thereof useful compounds may be attached to polyester surfaces without the necessity of exposing the polyester structure to elevated temperature.

The present invention is applicable to polyesters, e.g., polyethylene terephthalate, prepared by any method. The term "polyethylene terephthalate" used herein refers both to the homopolyester of ethylene glycol and terephthalic acid and to modified polyethylene terephthalates in which at least 90% of the recurring structural units are

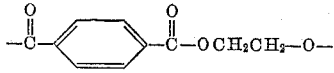

i.e., polyethylene terephthalate copolymers containing residues of other dicarboxylic acids or other glycols, composed of carbon, hydrogen, and oxygen, in significant quantities. For example, in some preferred modifications the polyethylene terephthalate copolymer may contain recurring polyester linking units comprised of aliphatic acids, glycols, and hydroxy acids, e.g., those selected from the series $HO(CH_2)_xOH$, where $x$ is an integer from 2 to 10, $HOOC(CH_2)_yCOOH$, where $y$ is 0 or an integer from 1 to 8, $HO(CH_2)_zCOOH$, where $z$ is an integer from 1 to 9, wherein the radicals $(CH_2)_x$, $(CH_2)_y$ and $(CH_2)_z$ may contain a radical of the type $(C_nH_{2n}O)_a$, where $n$ is an integer from 2 to 4 and "$a$" is an integer from 1 to 300. Other polyester linking units may be selected from the series isophthalic acid, phthalic acid, naphthalic acids, bibenzoic acids, and glycols such as bis-1,4-(hydroxymethyl)cyclohexane.

It will be apparent that many widely different embodiments of this invention may be made without departing from the spirit and scope thereof and, therefore, it is not intended to be limited except as indicated in the appended claims.

I claim:

1. The process of modifying solid linear fiber-forming polyesters of terephthalic acid and a glycol having from 2 to 10 carbon atoms which comprises generating carbonyl groups in the surface of the polyester by exposing the same to oxidizing conditions without significant degeneration of the polyester and thereafter contacting, without significantly dissolving, the activated surface with a dilute solution of a hydrazine compound of the formula $R_1R_2NNH_2$, in which each $R_1$ and $R_2$ is a member selected from the group consisting of hydrogen, monovalent hydrocarbon radicals, heterohydrocarbon radicals, nitro substituted hydrocarbon, amino substituted hydrocarbon, hydroxy substituted hydrocarbon, halogen substituted hydrocarbon, and heterohydrocarbon radicals, until a change in the color of the polyester takes place.

2. The process of claim 1 in which the structure is in the form of a fiber.

3. The process of claim 1 in which the structure is in the form of a film.

4. The process of claim 1 in which the activating treatment includes exposure of the structure to a powerful oxidizing agent.

5. The process of claim 4 in which the oxidizing agent is ozone.

6. The process of claim 4 in which the oxidizing agent is peracetic acid.

7. The process of claim 4 in which the oxidizing agent contains a chlorite.

8. The process of claim 4 in which the oxidizing agent contains a peroxide.

9. The process of claim 6 in which the oxidizing agent is a peracetic acid solution having a concentration of between 0.5% and 43% of peracetic acid.

10. The process of claim 1 in which the concentration of the hydrazine compound is at least 0.05%.

11. The process of claim 1 in which the hydrazine compound attaches chemically to the polyester in the amount of from 0.05 to 0.45 millimol per square meter of polyester surface.

12. The process of claim 11 in which the said amount is from 0.20 to 0.40 millimol of hydrazine compound per square meter of polyester surface.

13. The process of claim 1 in which the structure contains at least 90% of recurring structural units of the formula

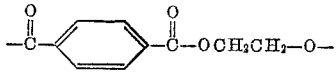

14. The process of claim 1 in which the treatment is carried out at room temperature.

15. The process of claim 1 in which the oxidizing treatment consists in exposure of structure surface to high energy ionizing radiation.

16. The product produced by the process of claim 1.

17. The product of claim 16 in which the structure is in the form of a fiber.

18. The product of claim 16 in which the structure is in the form of a film.

19. The product of claim 16 in which the structure is made from a polymer having a molecular weight in the fiber-forming range and which contains at least 90% of recurring structural units of the formula

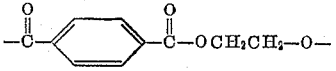

References Cited in the file of this patent

UNITED STATES PATENTS

| | | |
|---|---|---|
| 2,078,861 | Lantz _____ | Apr. 27, 1937 |
| 2,593,930 | Sprung _____ | Apr. 22, 1952 |
| 2,801,446 | Wolinski _____ | Aug. 6, 1957 |
| 2,801,447 | Wolinski _____ | Aug. 6, 1957 |
| 2,869,969 | Schulze _____ | Jan. 20, 1959 |